July 5, 1966  F. H. APPLETON  3,259,763
THERMALLY RESPONSIVE CONTROL MEANS
Filed Dec. 4, 1962  3 Sheets-Sheet 1

Francis H. Appleton,
Inventor.
Koenig, Pope, Senniger and Powers,
Attorneys.

Francis H. Appleton,
Inventor.
Koenig, Pope, Senniger and Powers,
Attorneys.

United States Patent Office 3,259,763
Patented July 5, 1966

3,259,763
THERMALLY RESPONSIVE CONTROL MEANS
Francis H. Appleton, Pasadena, Calif., assignor to Texas Instruments Incorporated, Dallas, Tex., a corporation of Delaware
Filed Dec. 4, 1962, Ser. No. 242,223
4 Claims. (Cl. 307—117)

This invention relates to thermally responsive control means, and with regard to certain more specific features, to such means for actuation of electric circuits.

Among the several objects of the invention may be noted the provision of thermally responsive control means for actuation of electrical circuits and particularly those adapted for accelerated cyclic action; the provision of switch means of the class described adapted for accelerated cooling to reduce cycling periods of switch-opening and switch-closing events, whether or not the switch means is adapted for accelerated heating; the provision of switch means of the class described adapted for improved thermostatic regulation of temperature changes induced by cooling, heating or both; and the provision of switch means of this class which may be constructed in reliable, compact and efficiently operable form. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

Figure 1:
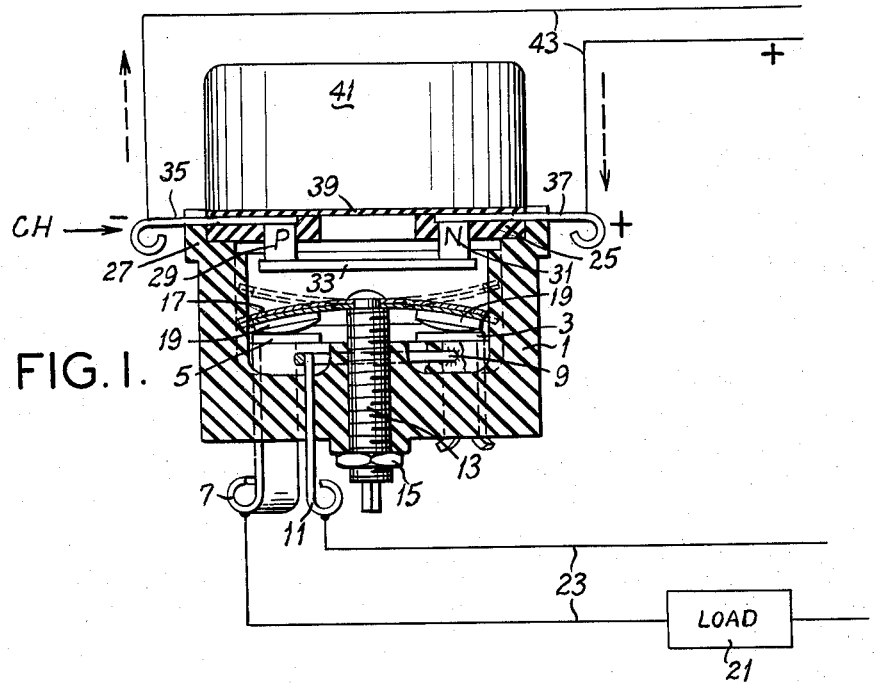

In the accompanying drawings, in which several of various possible embodiments of the invention are illustrated, FIG. 1 is a sectional view of switch means embodying one form of the invention in a circuit and FIGS. 2–5 are views similar to FIG. 1 but showing other forms of the invention in other circuits.

Corresponding reference characters indicate corresponding parts throughout the several views of the drawings.

As is known, prior thermally responsive control means such as thermostats, thermistors and the like have cycles of action which occur in response to heating and cooling. Heretofore heating and cooling have in some cases been effected simply in response to ambient heating conditions. In some cases heating has been effected by resistance heating in the thermally responsive elements per se and in other cases by auxiliary electric heaters, sometimes called anticipating heaters, which have an accelerating effect upon cycling. Auxiliary coolers have not been successfully employed, particularly on small switches, because of the complexities and bulk involved in the constructions of the coolers required. Auxiliary coolers are desirable because the period of a complete cycle of operations can be decreased not only by increasing the rate of application of heat to their thermally responsive elements during a heating part of a cycle, but also by increasing the rate of heat abstraction from such elements during the remainder of the cycle. By means of the present invention operating cycles may be shortened in a practical manner by use of the so-called Peltier effect. Hereinafter my improvements will be described in connection with a thermostatic switch as illustrative of one of the various types of thermally responsive control means, the operations of which are improved by means of the invention.

Referring now more particularly to FIG. 1, there is shown at numeral 1 a cup-shaped insulating switch housing which may, if desired, be quite small. This supports internal stationary contacts 3 and 5. Contact 5 extends outwardly to form a line terminal 7. The contact 3 has connected with it one end of a resistance heater wire 9. The other end of the wire 9 connects with a second exteriorly extending line terminal 11. A central post 13 is adjustably threaded in the housing 1 and carries a lock nut 15. The post 13 at its inner end supports a bimetallic snap-acting dished plate which may be in the form of a disc 17 having contacts 19 attached on its opposite margins. The line terminals 7 and 11 are connected to an electrical A.C. or D.C. load 21 (as desired) through wires 23.

The so-called cold position of the disc 17 is that shown in solid lines in FIG. 1, wherein contacts 19 engage contacts 3 and 5 in a closed-circuit position, energizing the load 21. The current carried to energize the load 21 excites the heater 9 to heat. The resistance in the disc 17 is such that the disc heats in response to this current. Thus the heater 9 accelerates the heating of the disc, which in due course snaps to the open-circuit position shown by the dotted lines in FIG. 1. Upon cooling of the disc, the circuit will reclose, after which the stated cycle of events repeats.

Heretofore, cooling of a disc such as 17 in a similar circuit awaited flow of heat from the disc to the cooler ambient atmosphere. This required considerable time, particularly in the usual cases in which a housing was closed, thus delaying transmission of heat from the thermostatic element to the ambient atmosphere.

According to the present invention, an insulating cover such as shown at 25 is recessed in a grooved rim 27 of the housing 1. This cover supports an internal thermoelectric device adapted to provide a Peltier effect, the same being arranged for cooling. To this end the cover 25 has thermoelectric elements 29 and 31 embedded therein. Each element 29, 31 is composed of a semiconductor material such as bismuth telluride ($Bi_2Te_3$) or lead telluride (PbTe). One of the thermoelectric elements such as 29 is doped with an impurity such as sodium to become a so-called acceptor or P-type thermoelectric element. The other thermoelectric element 31 is doped with an impurity such as iodine, to become a so-called donor or N-type thermoelectric element.

At numeral 33 is shown a copper junction piece conductively connecting elements 29 and 31. Attached to the element 29 is a connection 35, and attached to element 31 is a connection 37. Connections 35 and 37 are located in suitable grooves in the cover 25 and rim 27. All of the elements 33, 35, 37 are composed of materials such as copper which are compatible with the semiconductor elements 29 and 31. The term compatible means that the substances selected for the elements 33, 35 and 37 will not destroy the semiconductive properties of the elements 29 and 31 when proper electrically conductive connections are made, as by known appropriate bonding techniques.

Adhered to the upper side of the cover 25 is a thin sheet 39 of a heat-conducting but electrically insulating material, for example polyethylene terephthlate resin. The resin is adhered to a block of material such as copper 41 having a high heat mass adapted to function as a heat sink. Thus the parts 29, 31, 33, 35, 37, 39 and 41 form a unitary cover assembly. As shown in FIG. 1, the connectors 35 and 37 project exteriorly and are formed as line terminals for making connections with opposite sides of a line 43 carrying a direct-current voltage, polarized as shown by the plus and minus signs. Current of the plus sign will then flow as shown by the dotted arrows (FIG. 1). This causes the thermoelectric assembly (29, 31, 33, 35, 37, 39) to produce cooling of the junction piece 33, which in turn absorbs heat from the disc 17 by radiation and convection from the latter. The absorbed heat is transferred to the heat sink mass 41. It will be understood that in some cases the mass 41 may be omitted, the parts which mount the thermoelectric elements being sufficient for the purpose of conveying heat away from the disc. Thus a mass such as 41 is preferable, but dispensible. Hereinafter the cooler assembly 29, 31, 33, 35, 37 will be identified as a whole as a thermoelectric device CH. As a cooler for disc 17, the device CH will tend to produce or accelerate movement of the disc from the dotted-line hot position to its solid-line cold position, being in close heat-exchange relationship therewith. A reversal of polarity would cause heating of the junction piece 33 but this is irrelevant to the FIG. 1 form of the invention. It is relevant, however, to another form of the invention described below.

In view of the above, it will be seen that when the movable contacts 19 are closed on the fixed contacts 3 and 5, the load 21 is energized and current is carried through the heater 9 and disc 17. The disc is resistance-heated and the heater 9 accelerates its heating to snap the disc 17 from its cold to its hot (dotted-line) position. The heater is useful for accelerating snapping of the disc by overcoming the constant cooling effect of the thermoelectric device CH, which under some conditions might otherwise delay the opening action of the disc if its temperature rise due only to internal resistance were to be depended upon for opening action. The employment of the heater 9 is not always necessary.

In view of the above, it will be seen that the FIG. 1 arrangement exerts a cycling opening and closing action of the circuit 23 in connection with the load 21. The period of a cycle is reduced not only by the accelerating effect of the heater 9 in the circuit-opening part of the cycle, but also by the accelerated cooling effect of the thermoelectric device CH in the circuit-closing part of the cycle.

Figure 2:
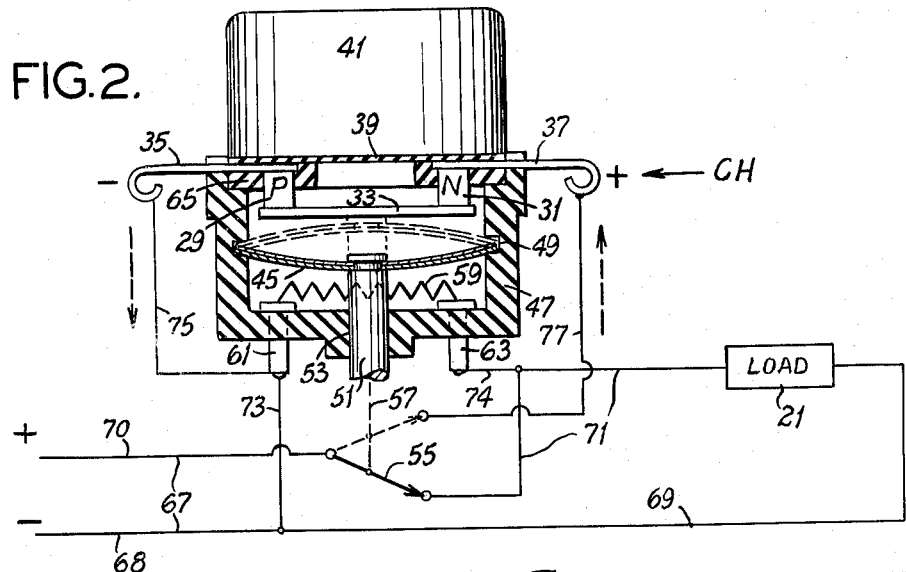

Referring now to FIG. 2, there is shown another form of the invention wherein the thermoelectric device CH is deexcited during the time the load is connected, and excited only during the interval that the load is disconnected. In this case the thermostatic disc 45 carries no contacts and is edge-supported in the housing 47 as at 49. It movably and centrally supports an operating rod 51 slidable through the bottom of the housing as at 53. Snap movement of disc 45 moves the rod 51 up and down. Rod 51 operates a switch 55 through driving connection 57. The housing 47 contains a heater wire 59 located under disc 45. This heater 59 is connected between switch terminals 61 and 63. The housing is closed by a cover 65 which supports a thermoelectric device CH, the constituent parts of which are the same as those of device CH in FIG. 1, like numerals designating like component parts.

Device CH is located above the disc 45 and in close heat-exchange relation thereto. At numeral 67 is shown a power supply circuit for the load 21. One side 68 of this circuit is connected to one side of the load through connection 69. The other side 70 of the circuit is connected to the other side of the load through connections 71 when the switch 55 is in the solid-line position shown. The heater 59 is in parallel connection with the load across the circuit in this solid-line position of switch 55 (see connections 73, 74).

The device CH completes a connetcion between sides 68 and 70 of the circuit when the switch 55 is in its dotted-line position. In this event the circuit to the load 21 and heater 59 is open. When the disc 45 is in its cool solid-line position shown, the switch 55 is caused to connect the load 21 and heater 59 in parallel across the circuit 67. The device CH at this time is disconnected. Then upon heating of the disc 45, it snaps to the dotted-line position. This throws switch 55 to its dotted-line position, breaking the load and heater circuits and closing the circuit through the device CH. The polarity, as indicated, is such that the device acts as a cooler for the disc 45.

The FIG. 2 arrangement has the advantage over the FIG. 1 arrangement that the heater and cooler are not energized at the same time, so that never does the effect of the cooler buck the effect of the heater. This results in a shorter heating part of the cycle than that of FIG. 1.

Figure 3:
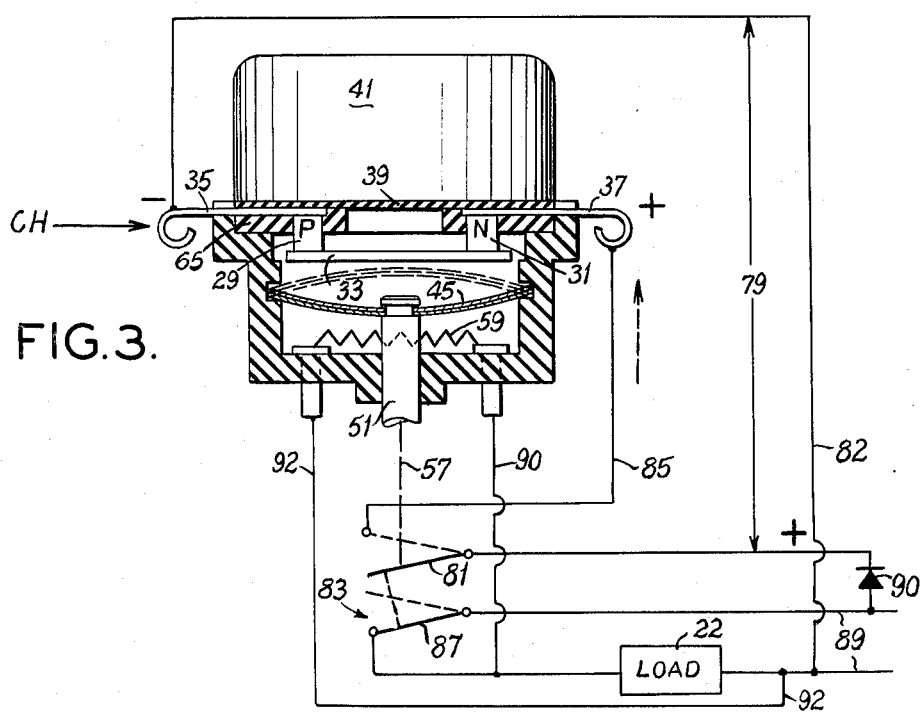

In FIG. 3 is shown a form of the invention like that shown in FIG. 2, wherein like numerals designate like parts. In this case a pulsed D.C. circuit 79 supplies current to the device CH with a polarity such that this device again acts as a cooler for disc 45. Current flows through one arm 81 of a double-pole switch 83 serving wire 85 when the switch is in the dotted-line position shown. The circuit 79 is broken and device CH is deenergized when the switch arm 81 is in the solid-line position. The other arm 87 of the switch 83 is connected to one side of an A.C. load circuit 89 when in the solid-line position shown. In this case when the switch arm 87 is in the solid-line position the load 22 and heater 59 become connected in parallel across the A.C. supply circuit 89 (see connections 90 and 92). The A.C. circuit supplies pulsed D.C. to circuit 79 through a diode 90 and a return lead 82. Other forms of rectifiers may also be used, such as a full-wave rectifier. If it is desired to omit the energization of circuit 79 from A.C. circuit 89, the diode 90 and connection 82 may be removed and circuit 79 supplied with appropriate D.C. from another source. The operation of this form of the invention is like that shown in FIG. 2, wherein the device CH acts as a cooler for the disc, except that the cycling action is operative in connection with an A.C. load circuit (FIG. 3) instead of in connection with a D.C. load circuit, as in FIG. 2.

Although the heaters 59 shown in FIGS. 2 and 3 are shown as so-called voltage heaters, being connected in parallel with the load, these may be placed in series with the load as in the case of FIG. 1.

Figure 4:
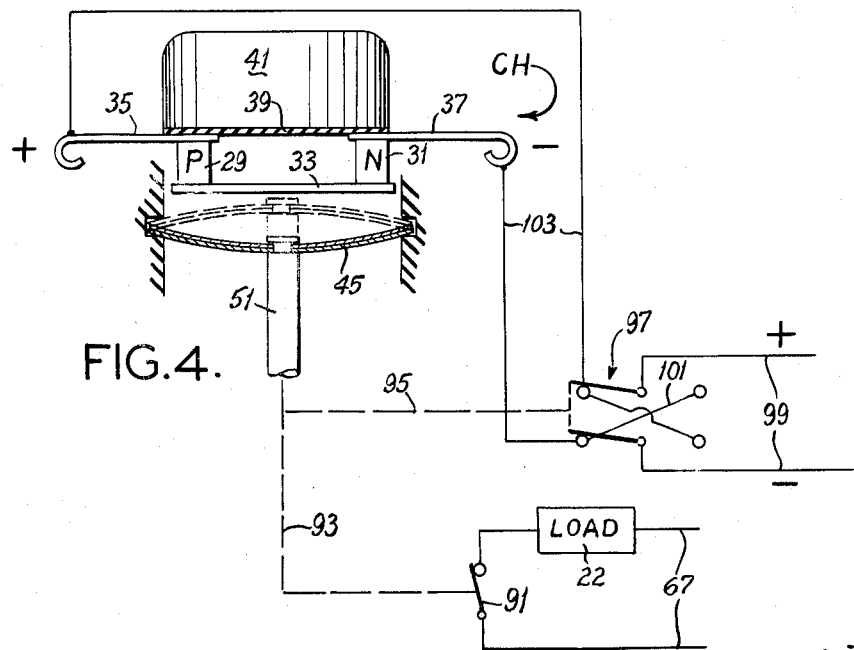

In FIG. 4 is diagrammatically shown another form of the invention in which some parts not requiring redescription have been omitted. Others not omitted but the same as those in FIGS. 1, 2 and 3 have been given like reference numerals. Additional parts are given new reference numerals. In this case a D.C. or an A.C. circuit 67, as desired, supplies the load 22 through a switch 91 having an operating connection 93 with the operating rod 51 of the thermostatic disc 45. When the disc 45 is cool (solid-line position), switch 91 is closed. The operating rod 51 also has an operating connection 95 with a double-pole, double-throw reversing switch 97, located in a D.C. circuit 99. The switch 97 has cross connections 101 for reversely connecting the circuit 99 with wires 103. This is for reversing the polarity applied to the device CH.

When the switch 97 is in the position shown, it will apply a plus polarity to connection 35, and the device CH will function as a heater for the disc 45. In this case heating occurs at the junction piece 33. When the switch 97 is in its opposite position, a positive polarity is applied to connection 37, and cooling occurs at the junction piece 33. Thus by reversing the direction of the position of switch 97, the device CH is converted from operation as a heater to operation as a cooler for the disc 45, and vice versa.

Operation of the FIG. 4 form of the invention is then as follows:

When the disc 45 is in the solid-line position shown, the switch 91 is closed as shown and the load 21 becomes excited. At this time the operating connection 95 has thrown the switch 97 to the solid-line position shown, wherein the plus side of the circuit 99 is applied to the connection 35. This makes the device CH a heater for the disc 45. The disc 45 then snaps to its dotted-line position, which opens the load circuit switch 91 and throws switch 97 to its alternate position wherein the plus side of the circuit 99 is connected with the connection 37, which converts device CH to function as a cooler for disc 45. This drives the disc 45 back to its solid-line position to complete a cycle of operations. When the device CH acts as a cooler, the copper piece 41, if used as shown, serves as a heat sink. Again, it is dispensible under suitable conditions. The advantage of the FIG. 4 form of the invention is that one thermoelectric element CH serves both as a heater and a cooler, thus eliminating the requirement for a separate electric heater such as 59 of FIGS. 1–3.

Figure 5:
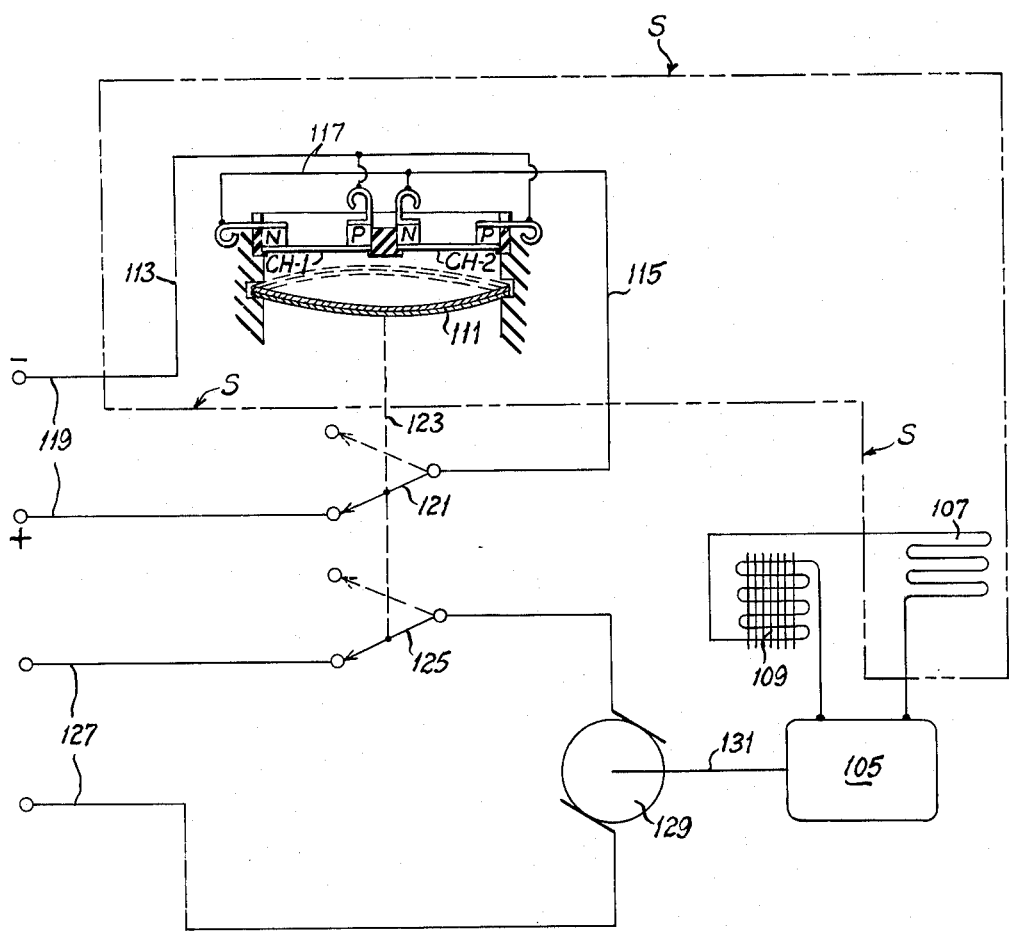

In FIG. 5 is shown a form of the invention applied to a control circuit of an air conditioning system. In this case the cooling of a space S is to be controlled. Cooling of space S is effected by means of a compressor 105 supplying compressed coolant through a condenser 109 to an evaporator 107. The evaporator 107 is arranged in connection with the usual fan (not shown) to cool the space S when the compressor 105 operates; otherwise it ceases to cool and the space S warms up.

In the space S is located an edge-mounted temperature-responsive thermostatic disc 111. At numerals CH–1 and CH–2 are diagrammatically shown a plurality of devices such as CH above described. These are in heat-exchange relationship with the disc 111. They are arranged in parallel connections between wires 113 and 115 (see connections 117). Wire 113 is connected to the negative side of a D.C. circuit 119. Wire 115 is connected to the positive side of this circuit through a switch arm 121. The connections are such that the polarities that are applied to devices CH–1 and CH–2 when switch 121 is closed, will cause each of these devices CH–1, CH–2 to function as a cooler for disc 111 in the manner above made clear.

The disc 111 has an operating connection 123 with switch arm 121, which extends also to form an operating connection with a second switch arm 125. The switch arm 125 is in a power circuit 127, supplying a motor 129 which drives the compressor 105 through a drive 131. When the disc 111 is in its warm solid-line position, calling for cooling, the switch arms 121 and 125 are closed. Cooling occurs during the time that the motor 129 drives compressor 105 (switch 125 closed). At the time that the cooling operation starts, switch arm 121 is also closed, which supplies a plus polarity to the thermoelectric devices CH–1 and CH–2 so that they operate as coolers for the disc 111. Thus these devices anticipate the cooling effect on disc 111 of the ambient coolant in space S. In due course, the sum of the cooling effects of the atmosphere in space S and of the devices CH–1 and CH–2 acting as coolers causes the disc 111 to snap to its dotted-line position, thereby opening switch arms 121 and 125. This cuts off the operation of the compressor 105 and de-excites devices CH–1 and CH–2. The disc 111 returns to its solid-line position when the space S has heated to a point at which cooling is again demanded.

It will be understood that while individual features of the invention are combined as shown in different figures, they may be recombined in various ways within the scope of the invention. Thus, for example, in FIG. 5 a reversing switch may be substituted for the switch arm 121 so as to reverse polarities of the devices CH–1 and CH–2 and cause them to operate as accelerating heaters for return of the disc 111 from a dotted-line to a solid-line position. Moreover, the feature of employing a plurality of parallel-connected devices such as CH–1 and CH–2 could be employed in other arrangements such as shown in FIGURES 1–4.

While the invention has been described in connection with a snap-acting thermostatic element such as 17, 45 or 111 performing as the thermally responsive control means, its advantages accrue also to the use in place thereof of devices such as creep-acting thermostats, solid-state sensors such as thermistors and other equivalents.

By the term Peltier effect is meant herein the cooling on the one hand which occurs at a junction between elements composed of dissimilar conductive materials when current flows in one direction through the junction from one conductive element to another, or the heating on the other hand which occurs when current flows in the opposite direction. The thermoelectric element described herein incorporating a junction piece between semiconductor materials is one example of a larger group of thermoelectric elements including direct junctions between semiconductor materials or two dissimilar metals.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Thermostatic control means comprising a thermostatic element adapted for resistance heating thereof and movable from a first to a second position, at least one thermoelectric element in heat-exchange relationship with said thermostatic element, said thermoelectric element adapted upon electrical excitation to function as a cooler in connection with the thermostatic element, circuit means adapted to supply an electrical load and excitation for said thermostatic and thermoelectric elements, switch means adapted in alternate positions alternately to excite the thermostatic element and the load on one hand and to excite the thermoelectric element on the other hand, and an operating connection between said thermostatic element and said switch means adapted to set it into one or the other of its alternate positions.

2. Thermostatic control means comprising a thermostatic element movable from a first to a second position, a heater element and at least one thermoelectric element each of which is in heat-exchange relationship with said thermostatic element, said thermoelectric element adapted upon electrical excitation to function as a cooler in connection with the thermostatic element, circuit means adapted to supply an electrical load and to excite said heater and thermoelectric element, switch means adapted in alternate positions alternately to excite the heater and the load on one hand and the thermoelectric element on the other hand, and an operating connection between said thermostatic element and said switch means adapted to set it into one or the other of its alternate positions.

3. Thermostatic control means comprising a thermostatic element movable from a first to a second position, at least one reversely polarizable thermoelectric element in heat-exchange relationship with said thermostatic element, said thermoelectric element adapted upon excitation according to reverse polarities to function as a heater or a cooler for said thermostatic element, load circuit means including a load switch, circuit means including a polarity-reversing switch, adapted alternately to excite said thermoelectric element according to reverse polarities, and operating means connecting the thermostatic element with said switches adapted to operate said load switch to open and closed positions and concomitantly to throw said reversing switch into polarity-reversing positions.

4. Thermostatic control means according to claim 3, wherein said reversing switch polarizes the thermoelectric element for heating when the load switch is closed and for cooling when the load switch is opened.

References Cited by the Examiner

UNITED STATES PATENTS 3,038,049   5/1962   Fritts _____ 200—122
3,157,801   11/1964  Shequen _____ 307—117

ORIS L. RADER, *Primary Examiner.*

MILTON O. HIRSHFIELD, *Examiner.*

W. SHOOP, *Assistant Examiner.*